May 12, 1953 W. G. WILSON 2,638,196
FLUID OPERATED MULTIPLE DISK CLUTCH
Filed March 18, 1946
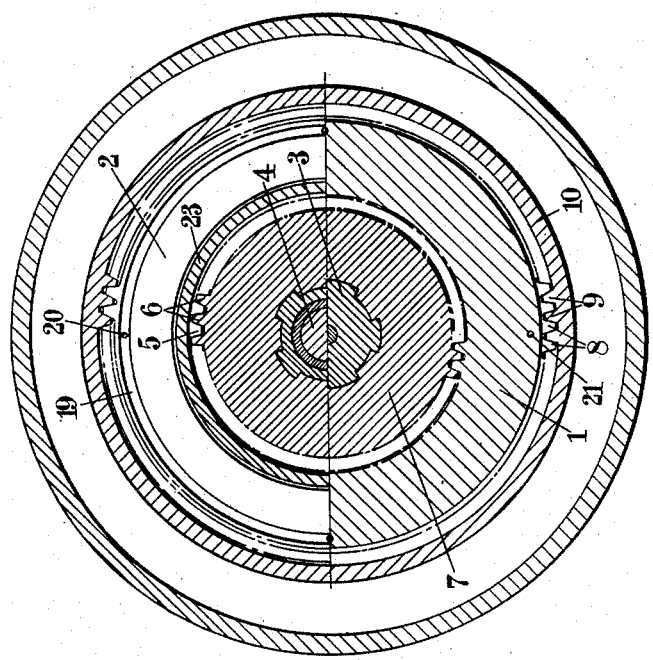
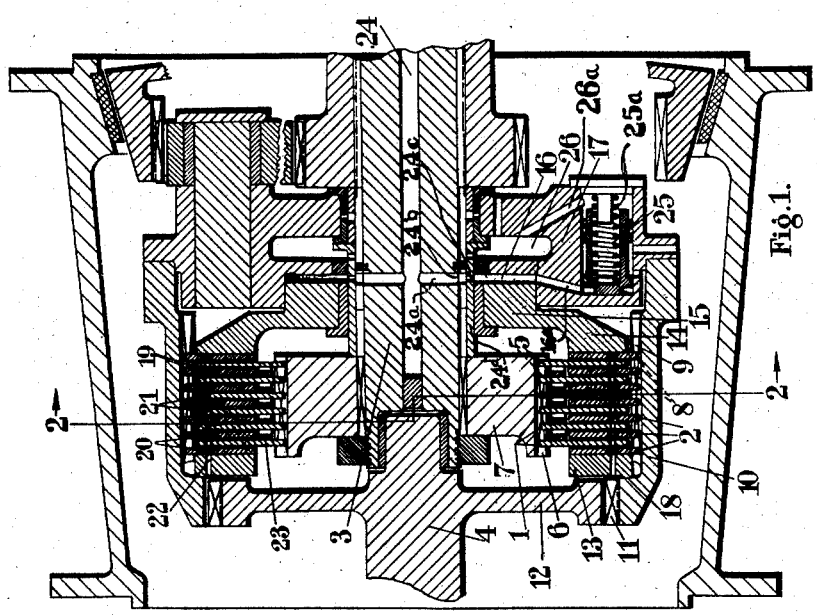
Inventor
W. G. Wilson
By Haseltine Downing Rubley
Attys.

Patented May 12, 1953

2,638,196

UNITED STATES PATENT OFFICE 2,638,196

FLUID OPERATED MULTIPLE DISK CLUTCH

Walter Gordon Wilson, Martyr Worthy, near Winchester, England

Application March 18, 1946, Serial No. 655,280
In Great Britain March 30, 1945

5 Claims. (Cl. 192—85)

This invention relates to hydraulic clutches of the type comprising intermeshing sets of plates or rings, alternate plates being coupled respectively to the input and output elements in a manner permitting axial displacement of the plates and wherein the clutching force is provided by the pressure of fluid acting directly on the plates and enclosed in a chamber which depends for its oil-tightness on the intimate mutual contact on the clutch plates. Such a clutch might for example follow the general principle of hydraulic actuation described in British patent specification No. 555,133.

In clutches of this type, even assuming high-grade workmanship, the surfaces of the plates are usually found to be minutely irregular with the result that oil under pressure enclosed at the outer peripheries of the plates, percolates through such irregularities when the plates are pressed into clutching contact, setting up an opposing pressure to that applied by an operative fluid on the pressure plate or piston. This percolating oil is liable to cover a considerable area of the contacting surfaces of the plates resulting in considerable loss of clutching power.

The object of the present invention is to provide an improved construction of clutch plates whereby the above disadvantages are eliminated.

According to the present invention conduit means are provided between the mutually contacting surface areas adapted to collect and disperse percolating fluid from the high pressure side and/or low pressure fluid percolating from the low pressure side under centrifugal action.

Preferably the surfaces of one or both sets of clutch plates at a position inwardly of their outer contacting peripheral margins are circumferentially grooved to collect the percolating oil and the plates are provided with apertures communicating with such grooves whereby the percolating oil passes to the low pressure side.

In the accompanying drawings:

Figure 1 is a section of a hydraulic clutch according to the invention,

Figure 2 is a cross section on the line 2—2 of Figure 1.

In carrying the invention into effect according to one convenient mode by way of example the invention is shown as applied to a hydraulic clutch in association with a pressure fluid valve control as described and claimed in my Serial No. 655,279, now Patent No. 2,583,919, issued January 29, 1952.

The clutch comprises two sets of intermeshing plates or rings 1 and 2 which are coupled respectively to the output and input elements 3 and 4. In the case of the inner set of plates 1, these are provided on their inner peripheries with teeth 5 engaging teeth 6 on a disc 7 which is splined to the output element 3. The outer set of plates 2 are provided on their outer peripheries with teeth 8 meshing with teeth 9 on a shell 10 which is coupled by meshing teeth 11 thereon and upon a disc 12 on the input element 4.

The outer plates of the outer set 2 are located between an abutment ring 13 and a pressure plate 14 integral with a piston element 15 which operates within a recess 16 in a cage 17 which is connected to the shell 10. The abutment ring 13 seats against a shoulder 18 on the shell 10.

On each surface of the plates 2 of the outer set and lying within the outer peripheral margin of contact of the sets of plates, circumferential grooves 19 are provided. Coincident with these grooves each plate is provided with a number of holes 20 which are circumferentially spaced. In the present case each plate is provided with four holes but any other suitable number may be provided.

The inner plates 1 are also provided with holes 21, four in number, which coincide with the grooves 19 of the outer plates.

It is to be noted that an area of contact between the sets of plates 1 and 2 is provided outwardly of the grooves and holes.

The abutment ring 13 is also provided with a number of holes 22 coinciding with the grooves 19.

The grooves 19 may alternatively or additionally be provided on the inner set of plates 1.

By the arrangement of the grooves and holes 19, 20 and 21 in the plates conduit means are formed whereby any high pressure fluid percolating between the plates from the outer peripheries when the clutch is on will collect in the grooves and pass through the holes 20 and 21 and the holes 22 in the abutment ring to the low pressure side.

At the same time any oil which may percolate between the plates from the low pressure side under centrifugal pressure will also be dispersed through the grooves and holes.

Between the adjacent plates of the inner set 1 sinuous spring rings 23 are provided for opening the plates when the clutch is out. Similar spring rings may be provided alternatively or additionally between the outer plates 2.

Pressure fluid for operating the piston 15 is supplied by suitable pump means through a bore 24 in the output element 3, radial passages 24a, space 24b, apertures 24c in the liner 24d and space 16 at the rear of the piston. A passage 16a leads to one end of the valve 25 located in a bore in the cage 17, such valve being controlled by fluid in a centrifugal pressure equalising reservoir 26 which communicates with the opposite end of the valve by means of a passage 26a.

The reservoir 26 receives oil from the lubrication system and the valve 25 functions in the manner disclosed in application No. 655,279, referred to, so that the piston will not be moved to put in the clutch until the pressure of the operating fluid is high enough to overcome the spring 25a of the valve. It can be seen that the plates are moved axially with preliminary contacting engagement by the piston 15 being operated by the pressure fluid passing along the axial bore 24 in the output element 3, the radial passages and into the space 16.

I claim:

1. A hydraulic clutch comprising input and output elements, intermeshing sets of annular clutch plates, alternate plates being coupled to said input and output elements respectively, a chamber under the action of high pressure fluid, the outer peripheries of said clutch plates being in communication with said chamber when the clutch is in, a further chamber under the action of low pressure fluid, the inner peripheries of said clutch plates being in communication with said further chamber, a cylinder, a pressure fluid actuated piston in said cylinder operatively connected to said clutch plates for axially displacing the plates to their clutching position, said clutch plates having conduit means located in their mutually contacting areas, and connected to said further chamber, said conduit means being adapted to collect and disperse to the further chamber pressure fluid percolating between the plates from the high pressure chamber and the pressure fluid percolating between the plates under centrifugal action from the said further chamber when the clutch is in.

2. A hydraulic clutch as claimed in claim 1, wherein said conduit means comprises circumferential grooves formed in the faces of one set of clutch plates in their mutually contacting areas, and apertures in all the plates communicating with said grooves.

3. A hydraulic clutch as claimed in claim 2, wherein the circumferential grooves are formed in the set of clutch plates connected to said output element.

4. A hydraulic clutch as claimed in claim 1, wherein said conduit means comprises aligned circumferential grooves formed in the faces of all the clutch plates in their mutually contacting areas and apertures in all of the plates communicating with said clutches.

5. A hydraulic clutch comprising input and output elements, a cylinder, a pressure fluid actuated piston element in said cylinder, an abutment ring spaced from said piston, intermeshing sets of plates located between the abutment ring and piston, alternate plates being coupled to said input and output elements respectively, said piston in its operative stroke axially displacing the plates to their clutching position, circumferential grooves in the faces of said plates in their mutually contacting areas, apertures in said plates communicating with said grooves and apertures in said abutment ring communicating with the groove on the face of the adjacent plate, said grooves being adapted to collect pressure fluid percolating from the pressure side between the plates and low pressure fluid percolating between the plates under centrifugal action when the clutch is in and disperse such fluid through the apertures in the plate and ring to the low pressure side.

WALTER GORDON WILSON.

References Cited in the file of this patent

UNITED STATES PATENTS

| Number | Name | Date |
|---|---|---|
| 987,954 | Brush | Mar. 28, 1911 |
| 1,189,176 | Price | June 27, 1916 |
| 1,245,718 | Herr | Nov. 6, 1917 |
| 1,380,823 | Matthews et al. | June 7, 1921 |
| 1,460,217 | Smith et al. | June 26, 1923 |
| 2,217,357 | Coe | Oct. 8, 1940 |
| 2,226,309 | Gleasman | Dec. 24, 1940 |
| 2,583,919 | Wilson | Jan. 29, 1952 |